July 23, 1968   N. KARPF   3,393,601
OPTICAL UNIVERSAL VIEWFINDER FOR PHOTOGRAPHIC AND MOVIE
CAMERAS WITH INTERCHANGEABLE OBJECTIVES
Filed Nov. 5, 1964
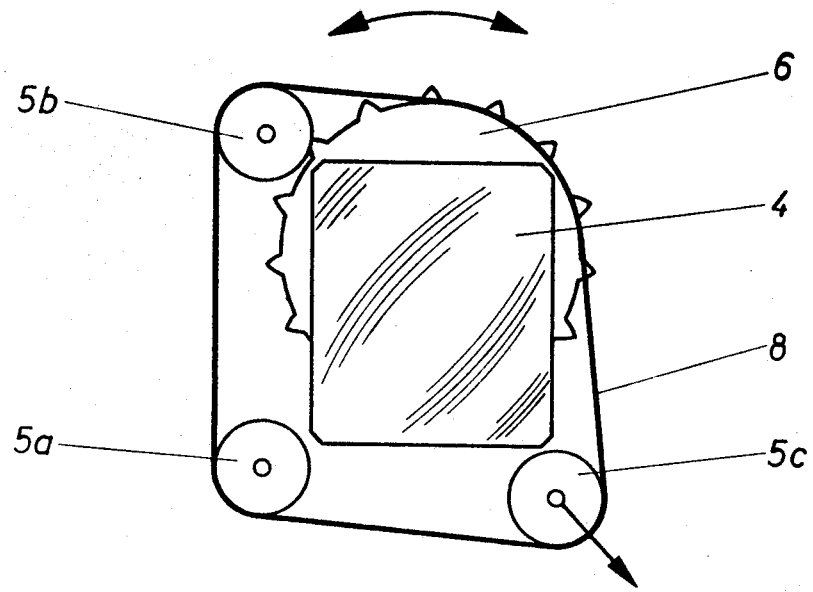
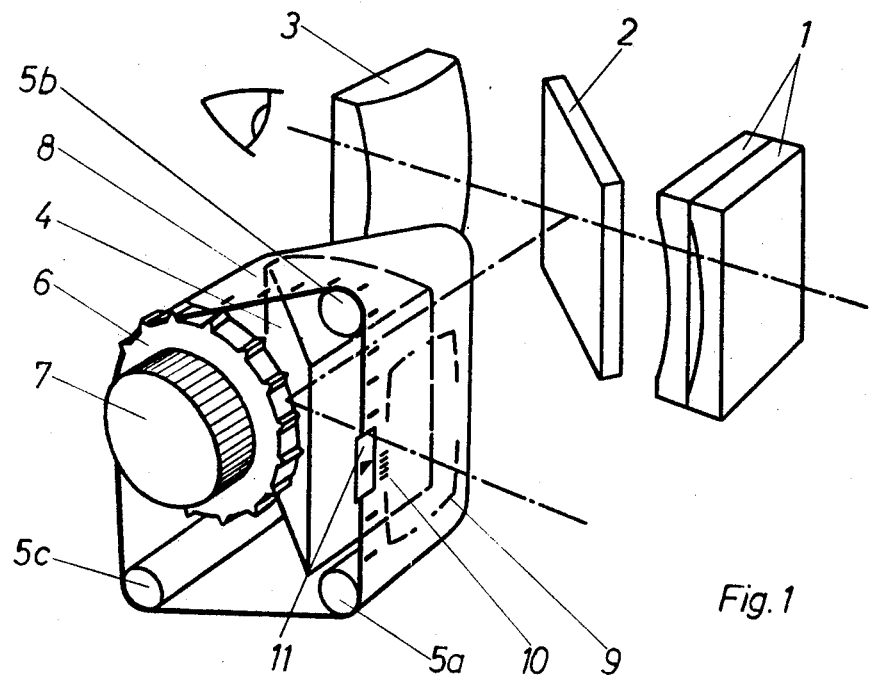
Inventor
Nikolaus Karpf
By Stevens, Davis, Miller + Mosher
Attorneys

United States Patent Office 3,393,601
Patented July 23, 1968

3,393,601
OPTICAL UNIVERSAL VIEWFINDER FOR PHOTOGRAPHIC AND MOVIE CAMERAS WITH INTERCHANGEABLE OBJECTIVES
Nikolaus Karpf, 45 Rupert-Mayer-Strasse,
Munich 25, Germany
Filed Nov. 5, 1964, Ser. No. 409,056
Claims priority, application Germany, Nov. 8, 1963,
L 46,312
4 Claims. (Cl. 88—1.5)

This invention relates to an optical universal viewfinder for photographic and movie cameras with interchangeable objectives.

To distinguish the image field for a photographic objective of given depth of focus a suitable limiting mask is usually placed on the front lens of the viewfinder or reflected into the path of the rays thereof. When using masks which are placed on the lens the mask itself has to be exchanged when the objective is changed, with the disadvantage that a plurality of masks must be carried around loose. With viewfinders for only two depths of focus of the objective it is also known to use a slide arranged in front of the front lens and containing two cut-outs forming the limiting masks. For viewfinders where the masks are reflected in substantially two methods have so far been known for adapting the image field of the viewfinder when the objective is changed. Some use a mask of variable size, which is relatively expensive if an anti-parallax device is also required. In most viewfinders where the mask is reflected, provided that they are designed for interchangeable objectives, a plurality of masks are arranged concentrically. They are usually all visible at the same time, so only a very limited number of focal depths of the objective can be included—in practice three at the most—since otherwise there is no clarity. Sometimes the masks not required at the time are covered. This does increase the clarity but not the number of depths of focus that can be used, since otherwise the mechanical outlay would have to be very great.

In viewfinders with extended masks compensation for parallax between the objective and the viewfinder is generally obtained—unless the attempt is merely abandoned—by displacing the eye-piece or inclining the whole viewfinder. The correct position is indicated by a scale but parallax can be equalised only approximately and never exactly. In viewfinders with the mask reflected the latter is generally moved automatically in dependence on the range adjustment of the objective.

It is one object of the invention to provide a viewfinder of simple construction which gives a clear picture of the limitation of the image field for a larger number of depths of focus of the objective.

It is another object of the invention to provide such a viewfinder which also gives exact compensation of parallax.

According to the invention the masks limiting the image field for the various objectives are arranged on a supporting band which can be moved lengthwise to change said masks. The supporting band is preferably in the form of an endless loop. Further according to the invention range scales and an anti-parallax mark may be provided and may be moved in relation to one another when the supporting band is moved lengthwise. One advantageous solution is for the range scales to be provided on the supporting band itself and for each mask to be associated with such a scale. Further according to the invention the masks and/or the scales may be produced photographically on the band, the band preferably being a strip of photographic film. The edge of the band may contain perforations into which a pinion engages to move the band lengthwise. In the case of a viewfinder where the masks are reflected the supporting band may, according to the invention, be led around a deflecting and image-forming prism.

This method of limiting the image field can be used both for viewfinders with the mask placed in front of the front lens and for those where the mask is reflected in. If the supporting band is long enough, and it can always be made long enough—if necessary by deflecting it several times—a large number of masks may be provided for different depths of focus. Only one mask will be visible at a time. The masks may be changed very rapidly and simply by displacing the supporting band. Apart from the advantages of cheap simple mass production, producing the supporting band photographically has the further advantage that special requirements as to given combinations of focus for the masks can be met at any time without difficulty and without extra expense.

The invention will now be explained using as an example a viewfinder where the mask is reflected in. One such viewfinder is shown in perspective representation in FIG. 1 with all unessential parts omitted. FIG. 2 is a side elevation of the mask support and of the associated parts visible to the eye when it is brought up to the oblique partially transparent viewfinder mirror and looks in the opposite direction to that taken by the light in reflecting the masks.

The viewfinder comprises two objective lenses 1, a partially transparent mirror 2 arranged at 45° from the optical axis of the viewfinder and an eye piece 3. To the side of the mirror 2 is a deflecting prism 4. At the side towards the mirror 2 a convex lens is cemented onto or formed integrally with the prism. In the focal plane of the lens system formed by the eye piece 3 and the lens connected to the prism 4 an image limiting mask must be provided so that it is clearly reflected approximately at infinity. This type of viewfinder is known.

Deflecting rollers 5a and b are provided in front of the prism 4 at the top and bottom. The common tangent at the front of both rollers is in the focal plane defined above. At the rear of the prism 4 a single deflecting roller 5c is provided at the bottom and a pinion 6 at the top. The pinion is linked to an operating knob 7 taken to the outside.

An endless supporting band 8 for the limiting masks is guided over the rollers 5a to c and the pinion. The band is preferably formed from the film strip perforated on one or both sides with its ends stuck or otherwise joined together. The pinion 6 engages in the perforation in the strip 8 of film. The roller 5c may be moved parallel in order to tighten the latter; this is indicated by an arrow in FIG. 2.

The desired masks 9 are applied in the normal photographic manner to the band 8 of film. The use of a band of film is particularly appropriate although the invention covers a series of other possible forms which the band 8 may take. It could, for example, even be made of metal or a suitable plastic. The mask 9 could be applied by stamping, etching, etc.

Apart from the mask 9 range scales 10 are applied to the band 8 in the same way, a scale being associated with each mask. The scales 10 must always be in the same position on the band 8 in relation to the centres of the associated masks 9. A countermark 11 for the scales 10 is rigidly mounted on the viewfinder housing. Below it the film strip is transparent in the suitable region. Conversely a scale could be attached to the housing and a mark, possibly an arrow, made on the band 8 for each mask 9.

The mode of operation of the viewfinder will be appreciated immediately. With the aid of operating knob 7 the band 8 of film is displaced until the masks 9 for the desired depth of focus is visible in the viewfinder and the stroke in the associated scale 10 representing the range adjustment is opposite the countermark 11. In this way the correct mask is set and parallax also compensated for.

The arrangement is particularly interesting for additonal viewfinders which can be placed on the camera. Where the viewfinders are included as a fixture in a camera the pinion 6 could suitably be coupled with the movement of the objective so that the supporting band 8 would automatically be moved to compensate for parallax. In this case the scale 10 could be dispensed with. A second mark would be sufficient if adjusted to the countermark 11 when the mask is changed. Before the mask is changed the pinion 6 would also have to be uncoupled and the objective adjusted to a specific range corresponding to the mark.

I claim:
1. An optical universal viewfinder for photographic cameras provided with interchangeable objectives comprising an objective lens and an eye piece defining an optical axis along which said lens and eye piece are spaced, a plurality of masks each corresponding to the image field for one of said objectives, an endless band, said masks being on said band, means for supporting said band spaced from said optical axis, means for displacing said band to position a selected mask appropriate to the selected objective so that the plane of said selected mask is substantially perpendicular to said optical axis and a pair of parallax compensating marking means, one of said marking means being on said band and being settable by appropriate displacement of said band into register with the other of said marking means approximate to the selected mask thereby to compensate for parallax, means within said band spaced from said optical axis and optically aligned with the selected mask for forming an image of said mask and of said parallax marking means and for deflecting these images to said optical axis, and a partially transparent mirror arranged at substantially 45° to said optical axis between said lens and said eye piece for reflecting into said eye piece the images of said mask and said parallax marking means deflected from said image-forming means.

2. A viewfinder as set forth in claim 1 wherein the image-forming and deflecting means is a prism.

3. A viewfinder as set forth in claim 1 in which the means for displacing said band comprise perforations in said band and a toothed wheel engaging said perforations.

4. A viewfinder as set forth in claim 1 in which said band is of flexible plastic material and in which the masks are formed photographically thereon.

References Cited

UNITED STATES PATENTS

| | | | |
|---|---|---|---|
| 1,137,864 | 5/1915 | King | 88—1.5 |
| 1,795,490 | 3/1931 | Howell | 88—1.5 |
| 2,217,930 | 10/1940 | Zimmermann | 88—1.5 |
| 2,542,939 | 2/1951 | Cisski | 88—1.5 |
| 3,062,086 | 11/1962 | Papke | 88—1.5 |
| 3,118,014 | 1/1964 | Winkler | 88—1.5 |

FOREIGN PATENTS

| | | |
|---|---|---|
| 212,148 | 11/1960 | Austria. |
| 725,018 | 3/1945 | Great Britain. |

JEWELL H. PEDERSEN, *Primary Examiner.*

O. B. CHEW, *Assistant Examiner.*